United States Patent [19]
Lenz

[11] Patent Number: 6,091,200
[45] Date of Patent: Jul. 18, 2000

[54] FLUORESCENT LIGHT AND MOTION DETECTOR WITH QUICK PLUG RELEASE AND TROUBLESHOOTING CAPABILITIES

[76] Inventor: Mark Lenz, 37 Iron Mt Rd., Kent, Conn. 06757

[21] Appl. No.: 09/213,691

[22] Filed: Dec. 17, 1998

[51] Int. Cl.⁷ .................................................. H05B 37/02
[52] U.S. Cl. .......................... 315/159; 315/158; 315/307; 340/541; 340/643; 439/320; 439/369
[58] Field of Search .................... 315/149, 154, 315/158, 159, 302, 295, 307; 340/522, 541, 643, 693; 439/147, 320, 369; 362/276; 250/221

[56] References Cited

U.S. PATENT DOCUMENTS

| | | | |
|---|---|---|---|
| 3,594,745 | 7/1971 | Nickels | 340/213.1 |
| 4,590,460 | 5/1986 | Abbott et al. | 340/541 |
| 4,691,974 | 9/1987 | Pinkerton et al. | 439/147 |
| 4,703,171 | 10/1987 | Kahl et al. | 250/221 |
| 4,810,936 | 3/1989 | Nuckolls et al. | 315/119 |
| 4,940,424 | 7/1990 | Odbert | 439/369 |
| 5,015,994 | 5/1991 | Hoberman et al. | 340/567 |
| 5,093,656 | 3/1992 | Dipoala | 340/522 |
| 5,130,613 | 7/1992 | Szuba | 315/291 |
| 5,153,560 | 10/1992 | Ichikawa | 340/522 |
| 5,211,570 | 5/1993 | Bitney | 439/320 |
| 5,220,250 | 6/1993 | Szuba | 315/307 |
| 5,282,118 | 1/1994 | Lee | 362/276 |
| 5,305,952 | 4/1994 | Hannarong | 236/47 |
| 5,357,170 | 10/1994 | Luchaco et al. | 315/159 |
| 5,381,323 | 1/1995 | Osteen et al. | 362/276 |
| 5,434,764 | 7/1995 | Lee et al. | 362/276 |
| 5,457,442 | 10/1995 | Lucero | 340/693 |
| 5,626,417 | 5/1997 | McCavit | 362/276 |
| 5,649,761 | 7/1997 | Sandell et al. | 362/276 |
| 5,649,835 | 7/1997 | Weed | 439/320 |
| 5,668,446 | 9/1997 | Baker | 315/294 |
| 5,699,243 | 12/1997 | Eckel et al. | 315/159 X |
| 5,818,338 | 10/1998 | Ferraro | 340/568 |

*Primary Examiner*—Haissa Philogene
*Attorney, Agent, or Firm*—DeLio & Peterson LLC; Robert Curcio

[57] ABSTRACT

An energy saving fluorescent light fixture for small confined areas predominant in residential settings, having a motion detector with a quick plug connector capable of attaching and detaching the detector from the light fixture base. Additional trouble-shooting capabilities are provided by dedicated electronic circuitry and LED display indicators. The LED display indicators signal a nontechnical consumer when maintenance is required, and isolate the failures to the sub-system level, i.e., the detector or fixture base circuitry. The detector is attached through the quick plug connector and concurrently supported by either an elbow joint with rigid wire supporting segments, a flexible arm, or a ball-swivel joint with rigid wire supporting segment. The supporting means enables the user to control the sensor viewing area. A simplified trouble-shooting method enabling the user to use the LED display indicators and quick plug connector facilitates sub-system replacement by nontechnical operators.

26 Claims, 7 Drawing Sheets

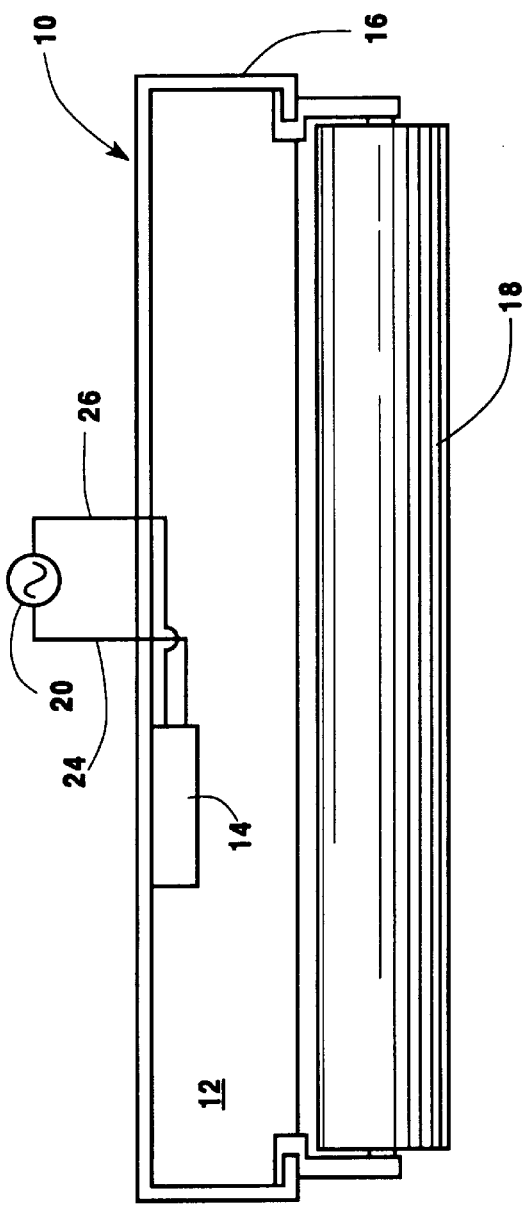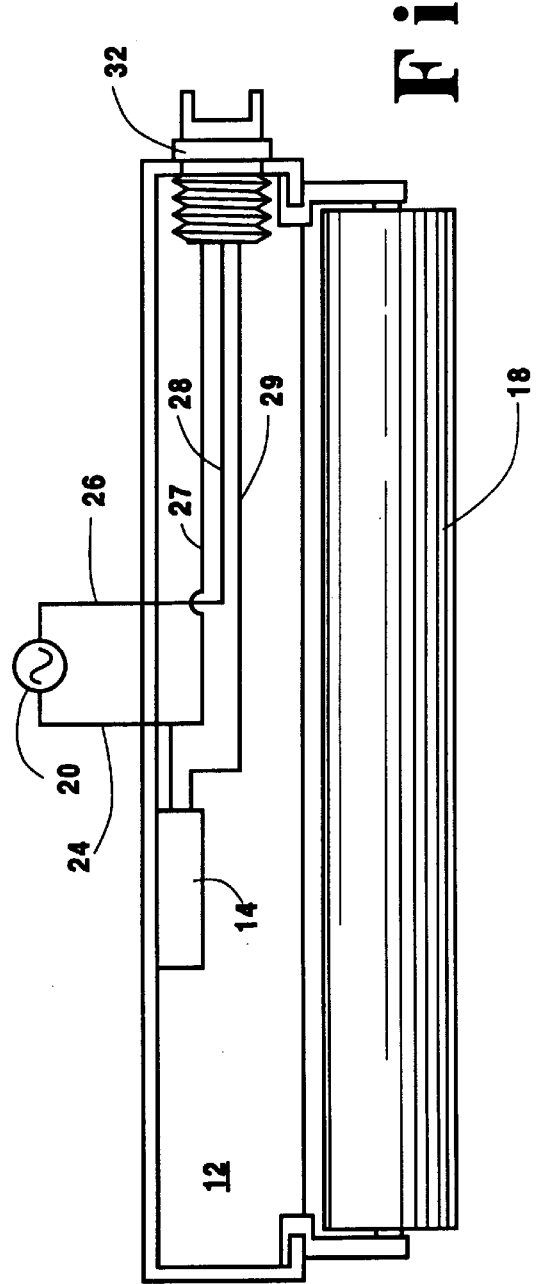

FLUORESCENT LIGHT AND MOTION DETECTOR WITH QUICK PLUG RELEASE AND TROUBLESHOOTING CAPABILITIES

BACKGROUND OF THE INVENTION

1. Field of the Invention

The present invention relates generally to lighting fixtures, and particularly to a fluorescent light fixture activated by an attached detector switch. More particularly, the invention relates to a fluorescent light fixture with a motion detector switch, troubleshooting capabilities, and a quick plug release mechanism for facilitating maintenance. This invention is predominantly directed to fluorescent lighting fixtures that may be utilized in confined spaces, such as a home closet space, and ultimately maintained by nontechnical consumers.

2. Description of Related Art

There is a considerable amount of energy wasted in residential applications by simply leaving the lights on when not needed. Typically the smaller confined spaces, closets, halls, attics, and the like, are generally more prone to being left on after the occupant has left the area. There are few automated controls available for the consumer to control the lighting in these areas. For example, manual switching designs for closet lighting are employed throughout the housing industry. The least expensive is the pull-chain switch. Another method is the standard wall switch that requires additional wiring to be run from the switch to the light. The third and most involved method involves a door switch. This involves carving a switch within the door jam and running a wire back to the light fixture. All three of these installations have disadvantages including leaving the closet light on for an extended period of time if not manually switched off. Recent advances in infrared, photocell, frequency, and timing technologies, however, have made the application of motion detectors, photo sensors, frequency sensors, and timing sensors feasible for commercial use. The National Electric Code, Article 410, requires a lighting fixture installed in a standard two foot deep closet space be of the fluorescent type. Installing and maintaining light fixtures with more complex electronics and sensor systems requires a level of knowledge in electronics typically not enjoyed by the nontechnical consumer. Thus, a need has developed for employing motion and photo sensors on fluorescent light fixtures capable of troubleshooting and easy maintenance by nontechnical residential consumers.

Basic motion sensor operated lighting systems are well known in the prior art. Controls for fluorescent lamps have been devised, and are now commercially available, that will turn a light circuit ON and OFF depending upon the signals provided by occupancy or light sensors. These sensors help to conserve energy and extend the life of the lamp by turning off the lamp when there is sufficient ambient light and/or there is no one occupying the sensing area. Typically, motion detectors are employed to conserve energy by turning off the light fixture when no motion is detected in the sensing region. Other sensors, such as photocells or photo sensors and the like, may be separately or jointly employed in similar applications. Generally, the motion detectors are passive infrared or Doppler technology devices that provide a signal when "occupancy" is detected in the sensing area. In contrast, a photo sensor senses the ambient light to determine if sufficient natural light is available.

The motion detector commonly keeps the light on for a pre-set period of time after motion has been detected. Thus, for example, when a person enters a room that is being sensed by a motion detector integrated with a light fixture, the light comes on for a predetermined period of time and remains on until a set time after motion has no longer been detected.

With increasing commercial availability of lighting fixtures integrated with motion and photo sensors, it has become increasingly more likely that non-trained users will be required to service and maintain these units. Thus, there remains a need for light fixtures integrated with such sensors to have "smart" built-in testing capabilities to accommodate the nontechnical consumer, and provide for minimal maintenance operations at the component level to facilitate part replacement if necessary.

Another problem with these fixture designs is that an infrared motion sensor must be offset from the lamps in order to avoid heat build-up from the lamps which will cause the sensor to activate and possibly fail prematurely. Solutions to this problem have included extending the infrared sensor a distance away from the lamp.

U.S. Pat. No. 5,649,761 issued to Sandell et al., on Jul. 22, 1997, entitled "EMOTION DETECTOR WITH SIDE-PIVOTING LIGHT FIXTURE", teaches a passive infrared motion detector attached to a base containing one or more lamp holders. The motion detector is situated away from the lamps by an arm that is pivotally connected to the back end of the lamp holder. This helps to eliminate the false activations by the thermal energy emitted from the lamps that have just been extinguished. However, the fixture provides no failure mode information for the user, nor does the integral nature of the fixture-sensor assembly allow itself for easy dismantling after a failure is detected.

Another common issue in lighting fixture designs involves integrating the sensor with different fixture housings that do not accommodate the optical viewing angles required by the sensor. Solutions to this problem include integrating the sensor housing within the lamp fixture such that the sensor's field of view always remains undisturbed by the fixture housing.

In U.S. Pat. No. 5,434,764 issued to Lee, et al., on Jul. 18, 1995, entitled, "LIGHTING FIXTURE WITH INTEGRAL MOTION DETECTOR", a one-piece lighting fixture is taught that includes a motion detector internal to the lamp housing. This fixture is predominately used in residential outside lighting, where the decorative style lamp fixture can block the motion detector's field of view. By placing the motion sensor's view port on the front of the lamp fixture housing, the lamp fixture decorative design will not interfere with the sensor's operational viewing area. However, having a "built-in" motion detector complicates any maintenance activity on either of the principle components of fixture.

Other designs have addressed energy management control circuitry to control the light intensity of fluorescent lamps. However, these designs remain electronically complex and lend themselves to factory troubleshooting and repair. For example, in U.S. Pat. No. 5,668,446 issued to Baker on Sep. 16, 1997, entitled, "ENERGY MANAGEMENT CONTROL SYSTEM FOR FLUORESCENT LIGHTING", a light control system is taught that controls the light level for the task being performed in the sensing area. This system adjusts the lamp's intensity in concert with the measured ambient light to reduce the amount of artificial light required. However, the complexity of this design generally prohibits built-in testing capabilities and simple maintenance operations for nontechnical users.

Bearing in mind the problems and deficiencies of the prior art, it is therefore an object of the present invention to provide a lamp fixture and control device for residential applications to minimize energy consumption and therefore minimize the cost of energy required to operate a dwelling.

It is another object of the present invention to provide a lamp fixture and control device for residential applications that increases the life of fluorescent lamps operated under its control.

A further object of the invention is to provide a lamp fixture and control device having built-in testing capabilities for facilitating repair by nontechnical users.

It is yet another object of the present invention to provide a lamp fixture and control device having easily detachable components for simplifying maintenance by nontechnical consumers.

Still other advantages of the invention will in part be obvious and will in part be apparent from the specification.

SUMMARY OF THE INVENTION

The above and other advantages, which will be apparent to one of skill in the art, are achieved in the present invention which is directed to, in a first aspect, a fluorescent lighting fixture for a controlled area, comprising: a fluorescent lamp; a base for establishing electrical connections with a source of electrical power, comprising mechanical connections for mounting the base, mechanical connections adapted to receive the fluorescent lamp, and having a first threaded plug connector; means for detecting occupancy in the controlled area, the occupancy detecting means having a second threaded plug connector for connecting with the first threaded plug connector on the base, a wire support segment attaching the occupancy detecting means to the second threaded plug connector, and the occupancy means adapted to receive the electrical power from the base and switch the electrical power to the lamp when the occupancy is detected; and, one of the base or the occupancy means having a threaded female plug connector, and the other of the base or the occupancy means having a threaded male plug connector matching the threaded female plug connector.

The lighting fixture further includes means for trouble shooting including determining when the following conditions occur: a) the electrical power is properly being delivered to the occupancy detecting means; and, b) the electrical power is properly being delivered by the occupancy detecting means to the lamp.

Additionally, the lighting fixture may include means for detecting low ambient light in the controlled area, such that the means for detecting occupancy and the means for detecting low ambient light combine to provide the source of electrical power to the lamp when the occupancy and the low ambient light are detected.

Importantly, the second threaded plug connector further includes a threaded plug cover slideably attached to the wire support segment and adapted to receive the threads of the first threaded plug connector.

The lighting fixture further comprises a motion detector having an infrared sensing device with a predetermined field of vision and an adjustable detection sensitivity level such that the motion detection is limited to the controlled area.

The lighting fixture further includes a timing circuit for removing the electrical power from the lamp after the occupancy has not been detected for a predetermined period of time. This period of time may be on the order of one minute.

The means for troubleshooting further includes means for displaying the troubleshooting condition with green and red light emitting diodes.

The threaded male end and female plug end further comprise three-prong mating electrical connections having electrical wire pigtails approximately six to twelve inches in length, and a key switch for mating alignment, such that one end of the plug has a male key and the other end of the plug has a receiving cavity.

In a second aspect, the present invention relates to a fluorescent lighting fixture for a controlled area, comprising: a fluorescent lamp; a base for establishing electrical connections with a source of electrical power, comprising mechanical connections for mounting the base, mechanical connections adapted to receive the fluorescent lamp, and having a first threaded plug connector; a motion detector adapted to detect occupancy in the controlled area, the motion detector having an attached second threaded plug connector for connecting with the first threaded plug connector on the base, and adapted to receive the electrical power from the base and switch the electrical power to the lamp when the occupancy is detected; one of the base or the motion detector having a threaded female plug connector, and the other of the base or the motion detector having a threaded male plug connector matching the threaded female plug connector; and, trouble shooting circuitry capable of determining and indicating when the following conditions occur: a) the electrical power is properly being delivered to the occupancy detecting means; and, b) the electrical power is properly being delivered by the occupancy detecting means to the lamp.

In a third aspect, the present invention relates to a fluorescent lighting fixture for a controlled area, comprising: a fluorescent lamp; a base for establishing electrical connections with a source of electrical power, the base having mechanical connections for mounting, and adapted to receive the fluorescent lamp; a motion detector adapted to detect occupancy in the controlled area having a predetermined field of vision and a predetermined detection sensitivity level such that the motion detection is limited to the controlled area, the motion detector adapted to receive the electrical power from the base and switch the electrical power to the lamp for a predetermined timing interval; a releasable threaded three prong plug connector with a female end and a male end, wherein the female end is attached to the base and the male end is attached to the motion detector; and, means for trouble shooting including light indicators for determining when the following conditions occur: a) the electrical power is properly being delivered to the motion detector; and, b) the electrical power is properly being delivered by the motion detector to the lamp.

The threaded plug connector male end may further comprise an in-line flexible extension arm connected to the motion detector for aligning and adjusting the detector, or an in-line ball and swivel joint connected to the motion detector.

In a fourth aspect, the present invention relates to a fluorescent lighting fixture for a controlled area, comprising: a fluorescent lamp; a base for establishing electrical connections with a source of electrical power, the base having mechanical connections for mounting, and adapted to receive the fluorescent lamp; a motion detector adapted to detect occupancy in the controlled area having a predetermined field of vision and an adjustable detection sensitivity level such that the motion detection is limited to the controlled area, and adapted to receive the electrical power from the base and switch the electrical power to the lamp; a releasable threaded three prong plug connector with a female end and a male end, each having wire support segments, wherein the female end is attached to the base and the male end is attached to the motion detector, the male end having a threaded plug cover slideably attached to the wire support segment on the male end, and adapted to receive the threads of the female end plug connector, a locking washer capable of adjusting and holding the plug connector in a stationary position for positioning the motion detector; a photocell for measuring ambient light intensity such that the motion detector and the photocell combine to provide the source of electrical power to the lamp when the occupancy and the low ambient light are detected; and, trouble shooting electronics including light emitting diodes for determining and displaying when the electrical power is properly being delivered to the motion detector, and, when the electrical power is properly being delivered by the motion detector to the lamp.

In a fifth aspect, the present invention relates to a method for troubleshooting a fluorescent lighting fixture comprising the steps of: a) providing the fluorescent lighting fixture previously described; b) monitoring the light indicators to determine a trouble-shooting condition; c) detaching the releasable threaded three prong plug connector when the light indicator indicates the electrical power is not properly being delivered by the motion detector to the lamp; and, d) replacing the motion detector with a second motion detector having a releasable threaded three prong plug connector capable of mating with the plug connector on the base.

In a sixth aspect, the present invention relates to a lighting fixture for a controlled area, comprising: a lamp; a base for establishing electrical connections with a source of electrical power, the base having mechanical connections for mounting, and adapted to receive the lamp; a motion detector adapted to detect occupancy in the controlled area; one of the base or the motion detector having a threaded female plug connector, and the other of the base or the motion detector having a threaded male plug connector matching the female plug connector, for attachment of the motion detector to the base; and, a trouble-shooting electronic circuit comprising: a printed circuit board; at least two light emitting diodes of different colors; and, a microelectronic device for operating the light emitting diodes to establish when the electrical power is being delivered to the motion detector, and when the electrical power is being delivered by the motion detector to the lamp.

In a seventh aspect, the present invention relates to a lighting fixture for a controlled area, comprising: a lamp; a base for establishing electrical connections with a source of electrical power, the base having mechanical connections for mounting, and adapted to receive the lamp; a motion detector adapted to detect occupancy in the controlled area; one of the base or the motion detector having a threaded female plug connector, and the other of the base or the motion detector having a threaded male plug connector, for attachment of the motion detector to the base; and, a trouble-shooting electronic circuit adapted to establish when electrical power is being delivered to the motion detector, and when the electrical power is being delivered by the motion detector to the lamp, comprising: a printed circuit board; at least two light emitting diodes having different colors; electrical connections to the source of electrical power having a high voltage line and a neutral line; low voltage and power supply electronic components adapted to connect to the source of electrical power wherein the power supply electronic components are adapted to provide constant power to one of the at least two light emitting diodes and the motion detector, and to toggle the electrical power to the lamp; an electrical component within the motion detector having an output electrically connected to another of the at least two light emitting diodes, for providing power to the another of the at least two light emitting diodes; and, an electrical sensor within the low voltage and power supply electronic components adapted to sense the output of the motion detector electrical component and provide a signal to the low voltage and power supply electronic components to toggle the electrical power to the lamp and the another of the at least two light emitting diodes.

BRIEF DESCRIPTION OF THE DRAWINGS

The features of the invention believed to be novel and the elements characteristic of the invention are set forth with particularity in the appended claims. The figures are for illustration purposes only and are not drawn to scale. the invention itself, however, both as to organization and method of operation, may best be understood by reference to the detailed description which follows taken in conjunction with the accompanying drawings in which:

FIG. 1 is a side elevational view of a fluorescent light fixture internally hard wired to the power mains.

FIG. 2 is the side elevational view of FIG. 1 with a female connector and electrical conductors wired to the power mains.

DESCRIPTION OF THE PREFERRED EMBODIMENT(S)

Figure 3:
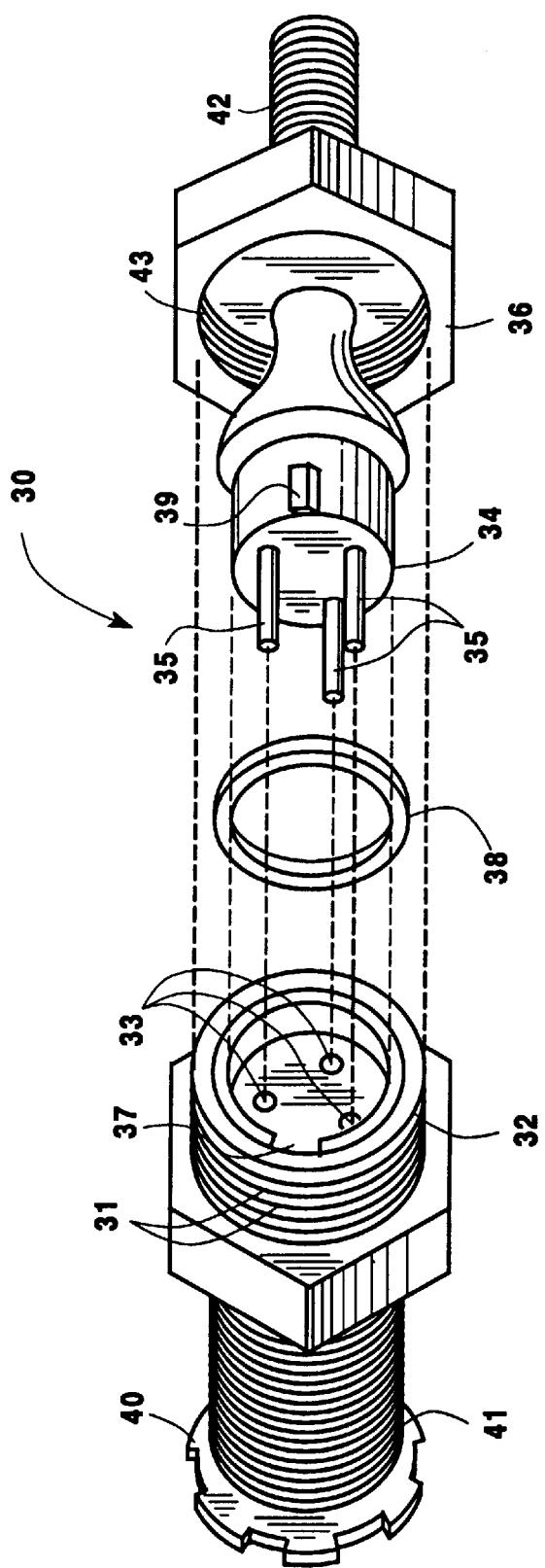
FIG. 3 is an exploded perspective view showing assembly of the quick plug connector male and female halves.

In describing the preferred embodiment of the present invention, reference will be made herein to FIGS. 1–6 of the drawings in which like numerals refer to like features of the invention. Features of the invention are not necessarily shown to scale in the drawings.

FIG. 1 depicts a fluorescent light fixture 10 typically used in residential structures. Fixture 10 has a base 12 with ballast 14 that is internally hard wired to the electrical mains 20, through neutral wire 24 and high potential wire 26. The electrical mains is usually governed by an external switch that enables a user to toggle the 120 VAC power to the light fixture. When the electrical mains 20 is toggled on, power is supplied to the ballast 14 which in turn provides electrical energy to the fluorescent bulb 18. In generally all types of fluorescent light fixtures the base 12 has perforated knock-out plates 16, typically ½ inch knock-outs that allow for electrical wiring connections within the base.

Integral to the instant invention is a quick plug connector capable of attaching and detaching a detector switch from the light fixture base. Preferably, the detector switch is a motion detector device capable of sensing occupants within the confined sensing area, and much of the remaining discussion is dedicated to an apparatus using this type of occupancy detection. However, other types of detector switches may be suitably employed, for example, a radio control switch, a photocell, a frequency control device, or a timing device. Importantly, by adding a quick plug connector to the fluorescent light fixture, regardless of the particular detector switch type utilized, the instant invention allows for simple replacement of the detector switch without having to disassemble the hard wired power mains connected to the fixture base 12.

FIG. 2 depicts the female receptacle 32 of a quick plug connector attached to base 12 through a side knock-out plate. The female connector includes wiring pigtails 27–29. The pigtails comprise a neutral wire 27, a high potential wire 28, and a switching wire 29. Neutral wire 27 connects to the neutral wire 24 of the electrical mains 20, while high potential wire 28 connects to high potential wire 26 of the mains. The high potential signal is routed away from the ballast 14, through the connector 32, in order to accommodate the controlled toggling of power to the ballast by the motion detector switch. Wire 29 represents this high potential signal from the power mains 20 through the motion detector controlled switch, that ultimately initiates the power to the ballast. Preferably, the female plug is a one-piece injected molded receptacle for light weight and durable use. Generally, a PVC type material is utilized for this application. The receptacle may also be adaptable to weather proofing with the simple addition of a grommet, made of a rubber material or other synthetic material, that will provide an environmental seal around the knock-out plate hole.

FIG. 3 details the quick plug connector 30 with female receptacle 32 and male plug 34. Locking nut 40 provides a secure fit to the light fixture base for the female receptacle. The receptacle is a three prong connector, having connection holes 33, and threads 31 to receive the male plug 34. A key-switch cavity 37 on the inside of the threaded female receptacle barrel locates the male plug connector prongs to their appropriate female connection holes. A rigid barrel 41 of variable predetermined length fixes the female receptacle 32 away from the fixture base 12. The male plug is a three-pronged plug, having electrical conductors 35 for insertion in the connection holes 33 of the female receptacle. The three-prong male plug 34 also has wire pig-tails of approximately six to twelve inches in length, with standard electrical color-coded identifiers. A single-key switch 39 is located on the male plug to mate with the corresponding receiving key-switch cavity 37 on the female receptacle. Plug 34 is attached by a plug cover 36 having threads 43 that correspond to threads 31 of the female receptacle. The plug cover 36 surrounds a wire support segment 42, and is slideably connected thereto, free to move against the end of plug 34 opposite the prongs 35 or be slid down wire segment 42 away from the three-pronged plug. Upon insertion of the three-prong plug, the plug cover 36 is rotated into place with the receiving, threaded female connector. Tightening the receptacle and plug threaded connector presses the two connector halves together, inserting prongs 35 within connector holes 33. This, in turn, forms a secured, removable connection that is structurally supported by the base 32 of the female receptacle which remains rigidly attached to the base of the light fixture. An environmental seal may be achieved by adding an optional washer 38 between the connector halves prior to attachment, as indicated in the figure.

Figure 4A:
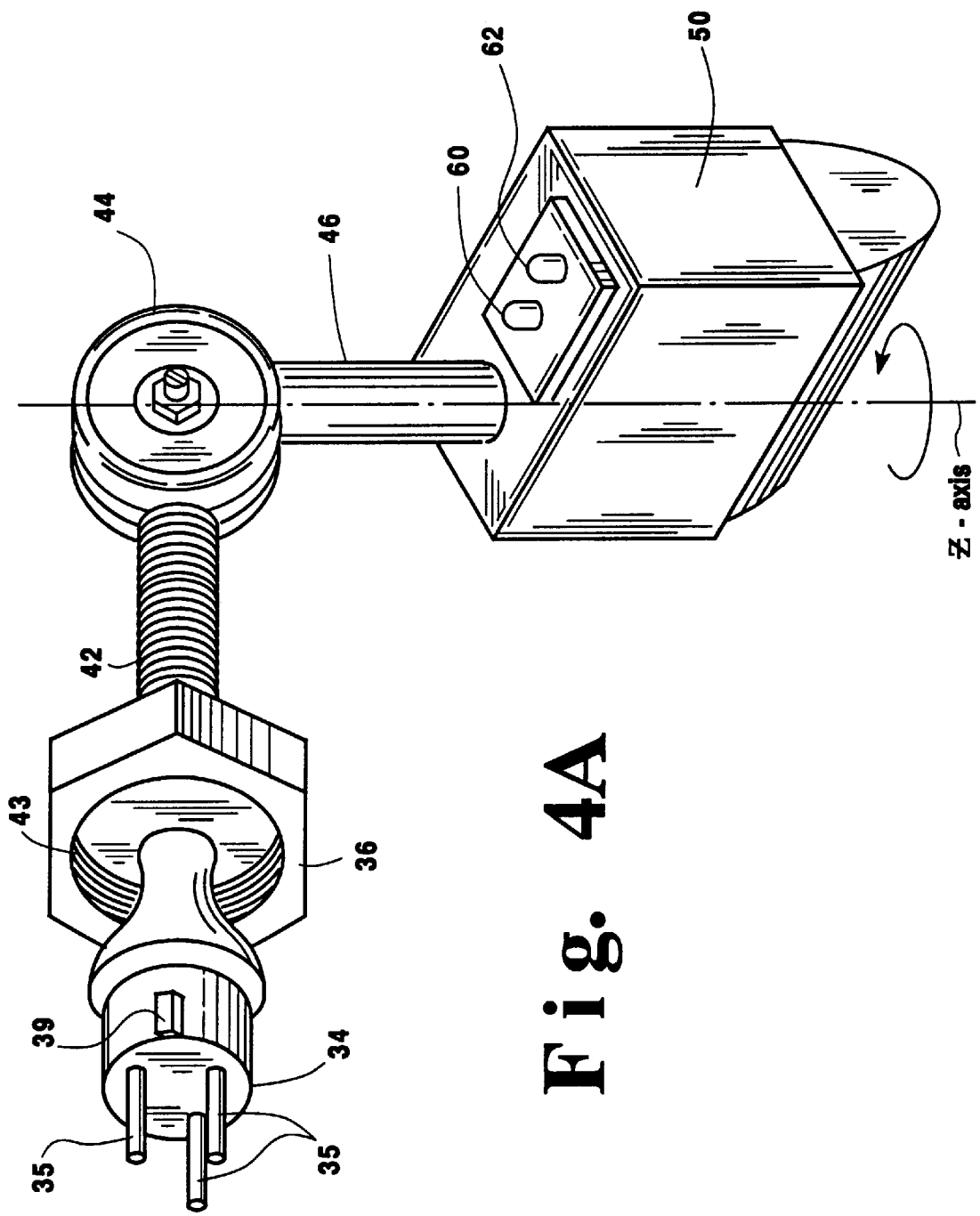
FIG. 4A is a perspective view which depicts the male plug with an elbow arm attachment and motion detector switch.

The male plug 34 is connected to a detector switch. As depicted in FIG. 4A, the male plug requires wire connections from prongs 35 through the wire support segment 42, elbow 44, and wire support segment 46, to the connecting motion detector switch 50. The wire support segments are comprised of hard plastic or molded plastic material. The adjustable elbow joint 44 and attached wire support segment 46 are used in conjunction with the motion detector switch 50 as a means for directing the motion detector sensing area.

Figure 4B:
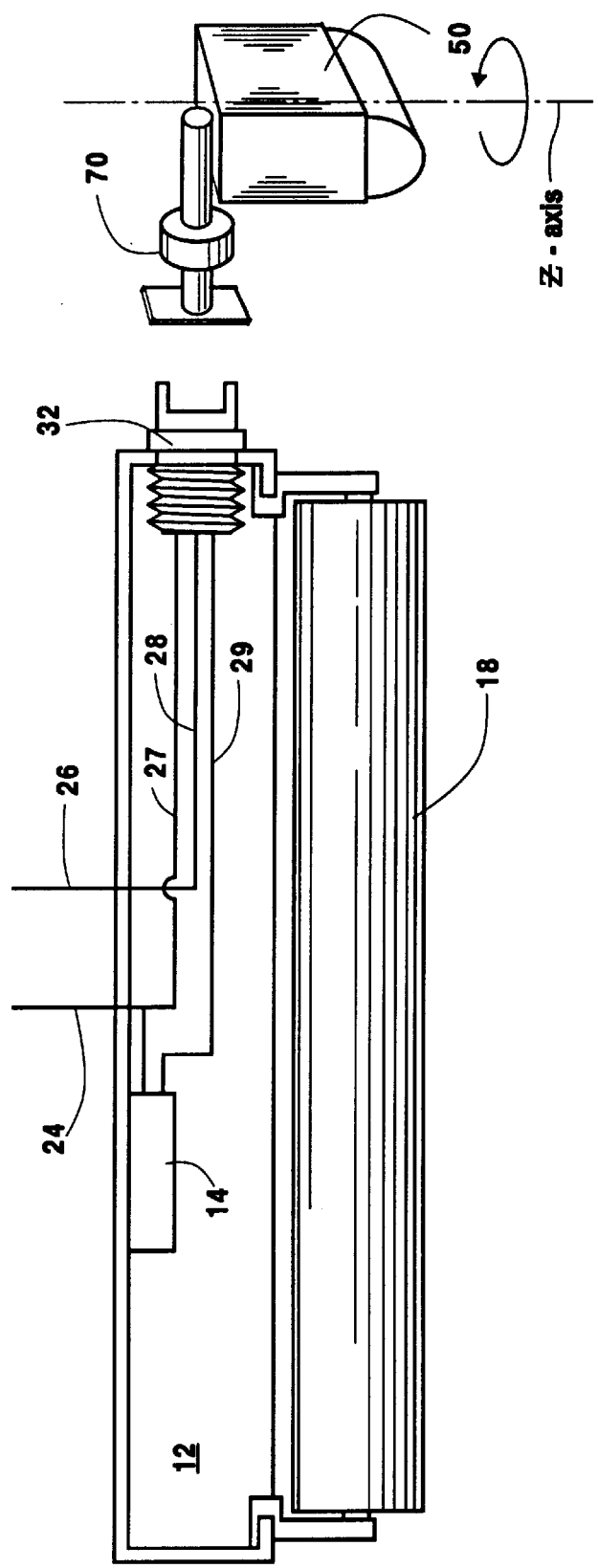
FIG. 4B is a perspective view which depicts the male plug with a ball swivel joint arm attachment and motion detector switch.

Another attachment scheme is a ball-swivel joint 70, FIG. 4B, which allows for rotational motion about the z-axis. The ball-swivel joint 70 may be secured to the motion detector wall or in-line with the plug connector. The ball-swivel must be large enough for the wires to pass through. Preferably, the ball-swivel joint will be limited to less than one revolution of motion to deter internal wire twisting and shorting that may occur with over-turning. More preferably, the ball-swivel joint is limited to a 90° range of motion. A clamp screw may be used to attach the ball-swivel joint to the motion detector wall.

Figure 4C:
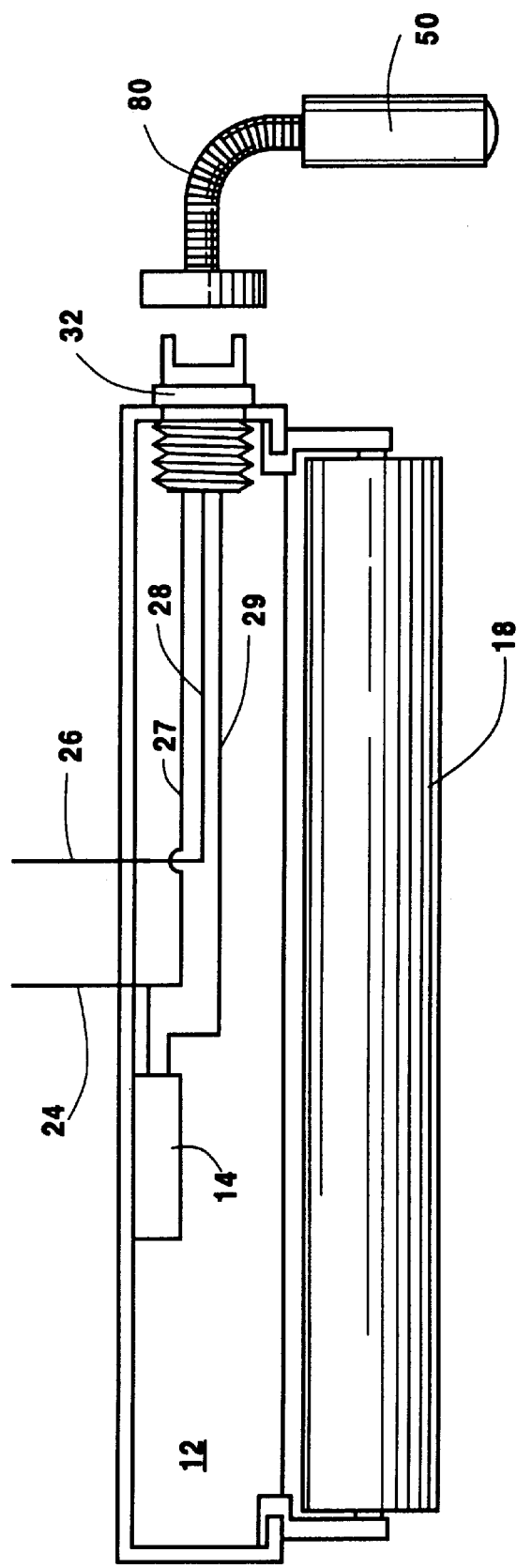
FIG. 4C is a perspective view which depicts the male plug with a flexible arm attachment and motion detector switch.

Still another attachment mechanism alternative is a flexible arm 80, FIG. 4C, rigid enough to support the motion detector 50 in a set position, but having flexibility to allow the user to manually align the motion detector and establish the most optimum positioning for operation. The flexible arm would extend from the male plug connector end to the motion detector switch base.

Preferably, motion detector 50 uses infrared sensing technology as used in other common motion detectors. This sensing system requires a line of sight and is most sensitive to lateral motion. The instant invention is designed specifically for small confined areas that would typically not require the use of a photocell, or other specialty features commonly used in concert with a motion detector switch (although such uses remain optional capabilities of this light fixture). In the small confines of a residential setting, for example in a closet, the fixture is required to operate under all types of lighting conditions when the door to the confined space is opened. Consequently, the lighting fixture would generally not require a sensitivity setting because the coverage area and depth of field are minimal. Therefore, the motion detector switch may be manufactured with a preset sensitivity setting. Some existing motion detectors also utilize a delay-ON feature to keep the lighting from coming on under false conditions. Generally, however, small confined areas in residential settings are motionless environments until their doors are opened, having little need for any false motion detection triggering circuitry. For the predicted uses of the instant invention, this added circuitry may be eliminated without sacrificing function. Existing motion detectors also require an adjustable timed-OFF delay in order to give the user a choice to select a setting. However, small confined areas are frequently used for short periods of time each day. When the area is not in use the light should be turned off to save energy. Given normal utilization patterns of small confined areas in residential settings, closets and the like, the instant invention is equipped with a predetermined timed-OFF delay, preferably set to approximately one minute. Conversely, the motion detector switch is set to turn the fluorescent light fixture ON without hesitation since motion detection implies an immediate need for illumination in the confined area.

Important to the instant invention is an additional modification to the motion detector electronics to add supervisory trouble-shooting capabilities with a user indicator or display feature. The trouble-shooting electronics control two light emitting diodes (LEDs) 60, 62 preferably green and red; a green LED to indicate 120 VAC power to the control device, i.e., that power is being delivered to the motion detection control circuitry, and a red LED to indicate that power is being switched by the control device to the lighting fixture.

Figure 5A:
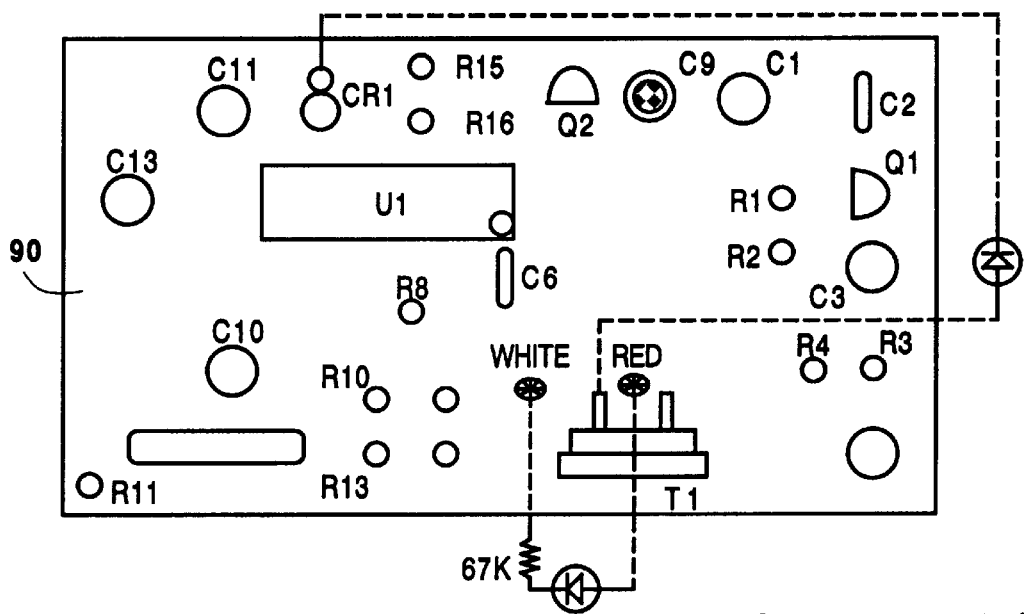
FIG. 5A is an electrical topography of the trouble-shooting circuit PCB Main Board.

FIG. 5A illustrates the topology of the PCB Main Board 90 with red and green light emitting diodes (60, 62). Capacitive elements (C1, C2, C3, C9, C10, C11, and C13), resistive elements (R1, R2, R3, R4, R10, R11, R13, R15 and R16), transistors Q1 and Q2, and microcircuit U1 combine to form the logic circuitry for trouble-shooting the light fixture.

Figure 5B:
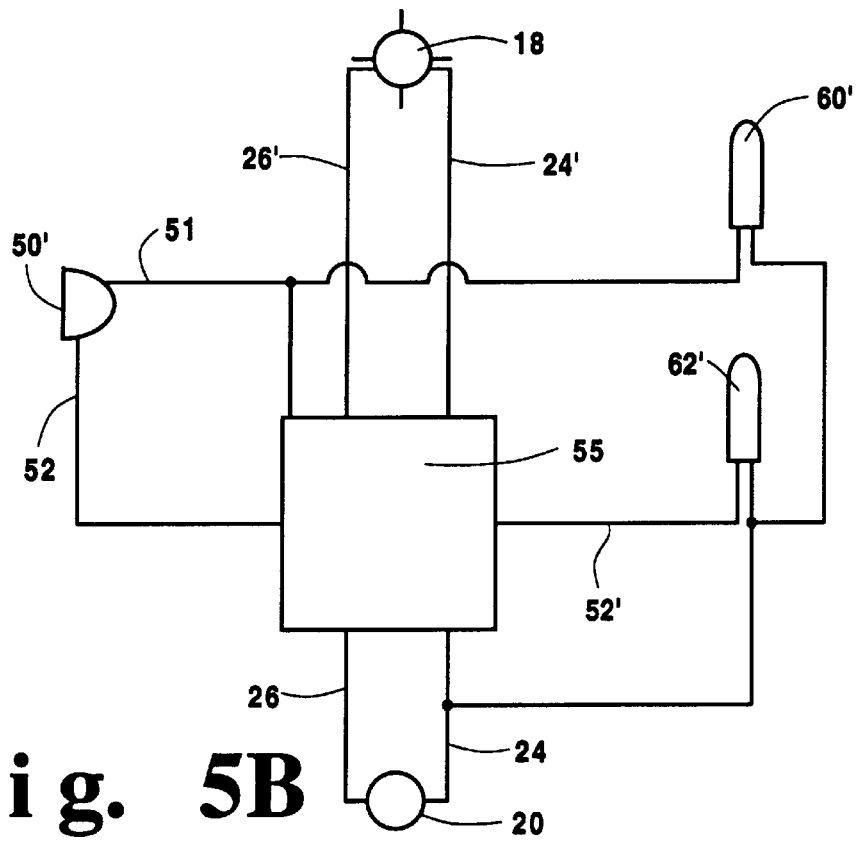
FIG. 5B is an electrical block diagram of the trouble-shooting circuit.

A block diagram of a light emitting diode supervisory circuit is illustrated in FIG. 5B. Low voltage and power supply electronic components 55 are connected to a source of electrical power 20 via neutral wire 24 and high potential wire 26. Constant power is fed to an electrical component within the motion detector 50' through electrical wire 52. A switched-power line 51 is connected to the low voltage and power supply electronics 55, the first LED 60', preferably a red LED, and an output of the motion detector electronic component 50'. Constant power 52' is also fed to the second LED 62', preferably a green LED, such that LED 62' receives power whenever power is supplied to the low voltage circuitry 55. In contrast, LED 60' is turned on only when the motion detector 50' transfers power to the light fixture 18, through switched power line 26' and neutral line 24'.

Table I below depicts the preferred light indications associated with the trouble-shooting conditions identified by the modified electronic trouble-shooting circuitry.

TABLE I

| LED Light Condition | Trouble-shooting Condition |
| --- | --- |
| Green & Red LED ON | Light Fixture operating properly - Green LED ON - Power On: 120 VAC power from mains feeding motion detector switch Red LED ON - Power being transferred to fixture (motion detector sending power to light) If light not operating properly - bulb is out or fixture is faulty |
| Green LED OFF | Motion detector not receiving power from power mains |
| Red LED OFF | Motion detector not switching power from power mains to light fixture; unit should be reset or replaced. |

The LED display allows a nontechnical consumer to trouble-shoot the light fixture to either the detector switch or the fixture base and its associated electronics. Maintenance activity will be indicated whenever an LED display light is off. The LED display and quick plug connector configuration greatly simplify the maintenance procedure required by the consumer. If the green LED light is off, as delineated in Table I, the motion detector is not receiving power from the power mains. Thus, trouble-shooting is directed to the fixture base circuitry. This will inform the consumer of a level of maintenance activity that includes the power mains circuitry; an activity that, for precautionary safety measures, may require further professional assistance. However, for the more common failure mode, if the red LED light is off, electrical energy is not being transmitted from the motion detector to the light fixture. In this case, trouble-shooting is directed to the motion detector sensor. Simple detachment and replacement of the motion detection sensor 50 is accomplished by releasing the quick plug connector and substituting a new motion detector for the defective one. Resetting of the unit is accomplished by disconnecting and reconnecting after several seconds. This scheme precludes having the nontechnical consumer from performing any direct maintenance on the hard wired power mains circuitry within the fixture base.

Figure 6:
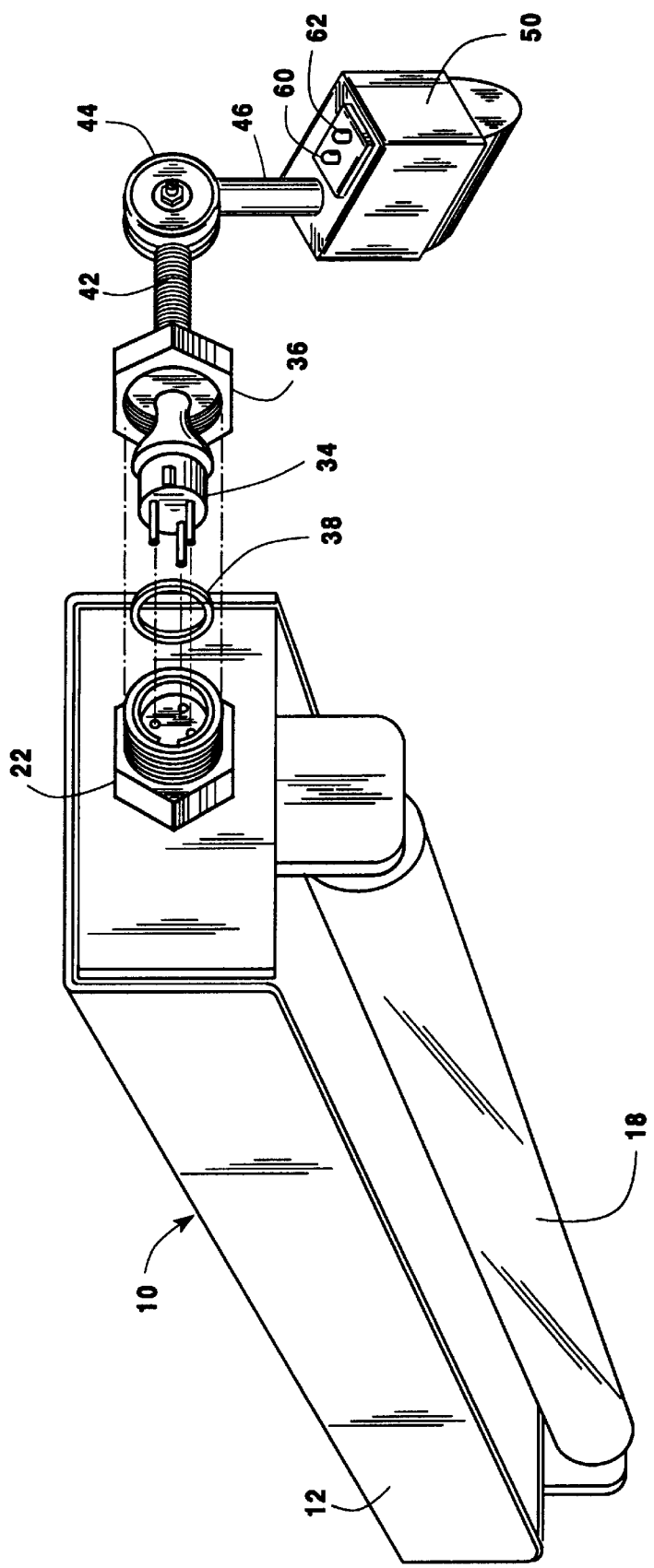
FIG. 6 is an exploded perspective view showing assembly of the fluorescent light fixture with a motion detector and quick plug connector.

FIG. 6 depicts the assembly of the motion detector switch 50 to a fluorescent light fixture 10 through the quick plug connector. This figure depicts assembly of the elbow joint embodiment, however, the other alternative designs are assembled in a similar manner.

A fluorescent light fixture with a motion detector having a quick plug connector is developed under the premise that turning lights off in unoccupied spaces saves energy. The apparatus described herein increases the life of fluorescent lamps operated under its control, and through its built-in testing capabilities facilitates repair by nontechnical consumers.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A fluorescent lighting fixture for a controlled area, comprising:
   a fluorescent lamp;
   a base for establishing electrical connections with a source of electrical power, comprising mechanical connections for mounting said base, mechanical connections adapted to receive said fluorescent lamp, and having a first threaded plug connector;
   means for detecting occupancy in said controlled area, said occupancy detecting means having a second threaded plug connector for connecting with said first threaded plug connector on said base, a wire support segment attaching the occupancy detecting means to said second threaded plug connector, and said occupancy detecting means adapted to receive said electrical power from said base and switch said electrical power to said lamp when said occupancy is detected; and,
   one of said base or said occupancy detecting means having a threaded female plug connector, and the other of said base or said occupancy detecting means having a threaded male plug connector matching said threaded female plug connector.

2. The lighting fixture of claim 1 further including means for trouble shooting including determining when the following conditions occur:
   a) said electrical power is properly being delivered to said occupancy detecting means; and,
   b) said electrical power is properly being delivered by said occupancy detecting means to said lamp.

3. The lighting fixture of claim 1 further including means for detecting low ambient light in said controlled area, such that said means for detecting occupancy and said means for detecting low ambient light combine to provide said source of electrical power to said lamp when said occupancy and said low ambient light are detected.

4. The lighting fixture of claim 1 wherein said second threaded plug connector further includes a threaded plug cover slideably attached to said wire support segment and adapted to receive the threads of said first threaded plug connector.

5. The lighting fixture of claim 1 wherein said occupancy detecting means comprises a motion detector.

6. The lighting fixture of claim 3 wherein said low ambient light detecting means comprises a photocell.

7. The lighting fixture of claim 5 wherein said motion detector comprises an infrared sensing device having a predetermined field of vision and an adjustable detection sensitivity level such that the motion detection is limited to said controlled area.

8. The lighting fixture of claim 5 further including a timing circuit for removing said electrical power from said lamp after said occupancy has not been detected for a predetermined period of time.

9. The lighting fixture of claim 8 wherein said predetermined period of time is approximately one minute.

10. The lighting fixture of claim 2 wherein said means for troubleshooting further includes means for displaying the troubleshooting condition with green and red light emitting diodes.

11. The lighting fixture of claim 1 wherein the threaded male and female plug connectors further comprise three-prong mating electrical connections having electrical wire pigtails approximately six to twelve inches in length, and a key switch for mating alignment, such that one end of said plug has a male key and the other end of said plug has a receiving cavity.

12. The lighting fixture of claim 11 further including a locking washer capable of adjusting and holding said plug connector ends in a stationary position for positioning said occupancy detection means.

13. The lighting fixture of claim 11 wherein said pigtails provide hardwired connections for said electrical power from said base to said occupancy detecting means.

14. A fluorescent lighting fixture for a controlled area, comprising:

a fluorescent lamp;

a base for establishing electrical connections with a source of electrical power, comprising mechanical connections for mounting said base, mechanical connections adapted to receive said fluorescent lamp, and having a first threaded plug connector;

a motion detector adapted to detect occupancy in said controlled area, said motion detector having an attached second threaded plug connector for connecting with said first threaded plug connector on said base, and adapted to receive said electrical power from said base and switch said electrical power to said lamp when said occupancy is detected;

one of said base or said motion detector having a threaded female plug connector, and the other of said base or said motion detector having a threaded male plug connector matching said threaded female plug connector; and, trouble shooting circuitry capable of determining and indicating when the following conditions occur:
   a) said electrical power is properly being delivered to said occupancy detecting means; and,
   b) said electrical power is properly being delivered by said occupancy detecting means to said lamp.

15. The fluorescent lighting fixture of claim 14 wherein said trouble-shooting circuitry is adapted to indicate when said conditions occur by providing power to light emitting diodes.

16. A fluorescent lighting fixture for a controlled area, comprising:

a fluorescent lamp;

a base for establishing electrical connections with a source of electrical power, said base having mechanical connections for mounting, and adapted to receive said fluorescent lamp;

a motion detector adapted to detect occupancy in said controlled area having a predetermined field of vision and a predetermined detection sensitivity level such that the motion detection is limited to said controlled area, said motion detector adapted to receive said electrical power from said base and switch said electrical power to said lamp for a predetermined timing interval;

a releasable threaded three prong plug connector with a female end and a male end, wherein said female end is attached to said base and said male end is attached to said motion detector; and, means for trouble shooting including light indicators for determining when the following conditions occur:
   a) said electrical power is properly being delivered to said motion detector; and,
   b) said electrical power is properly being delivered by said motion detector to said lamp.

17. The lighting fixture of claim 16 wherein said threaded plug connector male end further comprises an in-line flexible extension arm connected to said motion detector for aligning and adjusting said detector.

18. The lighting fixture of claim 16 wherein said threaded plug connector male end further comprises an in-line ball and swivel joint connected to said motion detector for aligning and adjusting said detector.

19. The lighting fixture of claim 16 wherein said threaded plug connector further comprises a single key switch on said male and female plug connectors for mating alignment.

20. The lighting fixture of claim 16 wherein said means for trouble shooting comprise electronic circuitry adapted to provide power to green and red light emitting diodes under predetermined trouble shooting conditions.

21. The lighting fixture of claim 16 further including a locking washer capable of adjusting and holding said plug connectors in a stationary position for positioning said motion detector.

22. The lighting fixture of claim 17 wherein said in-line flexible extension arm comprises a jointed, molded plastic tube approximately between one and two inches in length.

23. A fluorescent lighting fixture for a controlled area, comprising:

a fluorescent lamp;

a base for establishing electrical connections with a source of electrical power, said base having mechanical connections for mounting, and adapted to receive said fluorescent lamp;

a motion detector adapted to detect occupancy in said controlled area having a predetermined field of vision and an adjustable detection sensitivity level such that the motion detection is limited to said controlled area, and adapted to receive said electrical power from said base and switch said electrical power to said lamp;

a releasable threaded three prong plug connector with a female end and a male end, each having wire support segments, wherein said female end is attached to said base and said male end is attached to said motion detector, said male end having a threaded plug cover slideably attached to said wire support segment on said male end, and adapted to receive the threads of said female end plug connector, a locking washer capable of adjusting and holding said plug connector in a stationary position for positioning said motion detector;

a photocell for measuring ambient light intensity such that said motion detector and said photocell combine to provide said source of electrical power to said lamp when said occupancy and said low ambient light are detected; and, trouble shooting electronics including light emitting diodes for determining and displaying when said electrical power is properly being delivered to said motion detector, and, when said electrical power is properly being delivered by said motion detector to said lamp.

24. A method for trouble-shooting a fluorescent lighting fixture comprising the steps of:

a) providing the fluorescent lighting fixture of claim 15;

b) monitoring said light indicators to determine a trouble-shooting condition;

c) detaching said releasable threaded three prong plug connector when said light indicator indicates said electrical power is not properly being delivered by said motion detector to said lamp; and, d) replacing said motion detector with a second motion detector having a releasable threaded three prong plug connector capable of mating with said plug connector on said base.

25. A lighting fixture for a controlled area, comprising:

a lamp;

a base for establishing electrical connections with a source of electrical power, said base having mechanical connections for mounting, and adapted to receive said lamp;

a motion detector adapted to detect occupancy in said controlled area;

one of said base or said motion detector having a threaded female plug connector, and the other of said base or said motion detector having a threaded male plug connector, for attachment of said motion detector to said base; and, a trouble-shooting electronic circuit comprising
 a printed circuit board;
 at least two light emitting diodes of different colors; and, a microelectronic circuit for operating said light emitting diodes to establish when said electrical power is being delivered to said motion detector, and when said electrical power is being delivered by said motion detector to said lamp.

26. A lighting fixture for a controlled area, comprising:

a lamp;

a base for establishing electrical connections with a source of electrical power, said base having mechanical connections for mounting, and adapted to receive said lamp;

a motion detector adapted to detect occupancy in said controlled area;

one of said base or said motion detector having a threaded female plug connector, and the other of said base or said motion detector having a threaded male plug connector, for attachment of said motion detector to said base; and, a trouble-shooting electronic circuit adapted to establish when electrical power is being delivered to said motion detector, and when said electrical power is being delivered by said motion detector to said lamp, comprising
 a printed circuit board;
 at least two light emitting diodes having different colors;
 electrical connections to said source of electrical power having a high voltage line and a neutral line;
 low voltage and power supply electronic components adapted to connect to said source of electrical power wherein said power supply electronic components are adapted to provide constant power to one of said at least two light emitting diodes and said motion detector, and to toggle the electrical power to said lamp;
 an electrical component within said motion detector having an output electrically connected to another of said at least two light emitting diodes, for providing power to said another of said at least two light emitting diodes; and,
 an electrical sensor within said low voltage and power supply electronic components adapted to sense said output of the motion detector electrical component and provide a signal to said low voltage and power supply electronic components to toggle the electrical power to said lamp and said another of said at least two light emitting diodes.

* * * * *